US007942674B2

(12) United States Patent
Murphy

(10) Patent No.: US 7,942,674 B2
(45) Date of Patent: May 17, 2011

(54) LEARNING BRACELET

(76) Inventor: Dana Murphy, Holtsville, NY (US)

( * ) Notice: Subject to any disclaimer, the term of this patent is extended or adjusted under 35 U.S.C. 154(b) by 828 days.

(21) Appl. No.: 11/431,249

(22) Filed: May 10, 2006

(65) Prior Publication Data

US 2007/0275356 A1 Nov. 29, 2007

(51) Int. Cl.
*G09B 19/00* (2006.01)
(52) U.S. Cl. ...................................... 434/156
(58) Field of Classification Search .................. 434/156, 434/157, 167; 40/299.01, 633; 283/45, 46
See application file for complete search history.

(56) References Cited

U.S. PATENT DOCUMENTS

| | | | | |
|---|---|---|---|---|
| 1,407,239 A * | 2/1922 | Herman | ........................... | 281/51 |
| 1,427,891 A * | 9/1922 | Ziegler | ............................ | 40/633 |
| 2,510,224 A * | 6/1950 | Hettinger | ......................... | 40/633 |
| 2,553,676 A * | 5/1951 | Roos | ............................... | 281/51 |
| 2,776,848 A * | 1/1957 | Stupell | ............................. | 281/51 |
| 3,751,835 A * | 8/1973 | Smith | ............................. | 40/633 |
| 4,377,047 A * | 3/1983 | Adams et al. | ................... | 40/665 |
| 4,802,855 A * | 2/1989 | Wood | ............................. | 434/157 |
| 4,906,025 A * | 3/1990 | Schreindl | ......................... | 281/45 |
| 4,984,683 A * | 1/1991 | Eller | ................................. | 206/38 |
| 5,081,852 A * | 1/1992 | Cox | ..................................... | 63/3 |
| D332,970 S * | 2/1993 | Myers | ............................ | D19/78 |
| D344,628 S * | 3/1994 | Taggart | ......................... | D3/215 |
| 5,311,689 A * | 5/1994 | Lindsey | .......................... | 40/633 |
| 5,581,924 A * | 12/1996 | Peterson | ......................... | 40/633 |
| 5,765,875 A * | 6/1998 | Rowley | ............................ | 283/74 |
| 5,877,742 A * | 3/1999 | Klink | ............................... | 345/685 |
| 6,325,630 B1 * | 12/2001 | Grabmayr | ..................... | 434/157 |
| 6,481,127 B1 * | 11/2002 | Bilbie et al. | ............... | 40/299.01 |
| 6,766,039 B1 * | 7/2004 | Al-Sheikh | ...................... | 382/115 |
| D497,826 S * | 11/2004 | Nelson | ............................ | D11/3 |
| 6,926,529 B1 * | 8/2005 | Voit | ................................... | 434/167 |
| 6,976,327 B2 * | 12/2005 | Goodin et al. | .................. | 40/633 |
| 7,240,446 B2 * | 7/2007 | Bekker | ............................ | 40/633 |
| 7,286,322 B2 * | 10/2007 | Banal | ............................ | 360/132 |
| 2004/0074257 A1 * | 4/2004 | Weiss et al. | ......................... | 63/3 |
| 2005/0037323 A1 * | 2/2005 | Basson | .......................... | 434/236 |

* cited by examiner

*Primary Examiner* — Kurt Fernstrom
(74) *Attorney, Agent, or Firm* — Leo G. Lenna

(57) ABSTRACT

The invention is directed to a learning bracelet that contains a compartment for placing learning tags for display. The learning tags can either be pre-printed with a word and/or can be made printer friendly so that the desired word and/or concepts can be printed upon the learning tag before being used. Once inserted into the learning bracelet, the learning tag displays the word and/or concept to the person wearing the learning bracelet. The displayed word and/or concepts can be view by the student using the bracelet so as to reinforce the word, its spelling and or meaning.

10 Claims, 5 Drawing Sheets

LEARNING BRACELET

FIELD OF THE INVENTION

This invention relates generally to the field of education, and more specifically to the learning of vocabulary words, phrases and/or short messages. Most specifically, the invention relates to a learning bracelet that can be worn by a student in school or at home. The bracelet has a compartment/space to display a vocabulary word, a phrase and/or short messages so that it can be observed by the student during the day and referred to when needed. The invention further pertains to a learning bracelet kit and method of learning new vocabulary suing the learning bracelet and/or kit.

BACKGROUND OF THE INVENTION

Teachers, parents, and coaches are constantly looking for new resources to aid in the education process in the schoolroom, the athletic arena, and the like. Educators would ideally like to have cost effective products that are also reusable as aids for the students to use when they are performing their lessons.

Although computers and the internet have provided many new learning tools, these learning tools usually need to be used under adult supervision and/or cannot be used by all students in the class at the same time. In addition, to use computer based programs the students must be locked in front of the computer and cannot move about.

In more structured environments, such as educational classrooms, a variety of word lists and workbooks have been prepared for teaching vocabulary. One common classroom method begins with the highly structured pre-testing of vocabulary, followed by a study of new or challenging words such as with work sheets or homework problems, and then post-testing. The word lists may be found in bound texts, or on loose work sheets. While this approach has been used successfully with a large number of students, and tends to teach a large vocabulary in a relatively short period of time, this technique is only practical where the students have significant time available for classroom and study.

The above method does not work, however, for all students at all times. Many students need consistent, repetitive reinforcement on particular concepts and or content areas. All students have different learning styles and needs. Some are visual, linguistic, and or tactile learners. These three learning styles are part of the multiple intelligences. To implement these three intelligences, there is a need for a fun and innovative way to get the student, with instructional support and reinforcement, to focus their attention in an enriching way.

Several popular games have been created that offer students more opportunities to learn vocabulary words in a more relaxed and entertaining setting. Among these are well-known games that offer real words and definitions, together with opportunities for participants to create either imaginary words or imaginary definitions. Then the participants must try to identify the real word or definition. Unfortunately, and much like the word lists referred to above, the words are rarely seen more than once or twice, and when they are seen multiple times by the players, the alternatives that the players create as a part of the game tend to obfuscate one's memory of the real word and definition. Consequently, many of these games have only limited value in expanding vocabulary.

Many educational tools are available on the market, but all have their shortcomings. For example, one educational aid available is a ring binder with pages having partially printed sentences, and spaces for attaching Velcro™-backed words and pictures that can be used to complete the sentences. A child will read a sentence and then select pictures and words to complete the sentence. This book is primarily directed towards new readers, and is relatively bulky. The concept may perform well in a fixed location such as a classroom, but once again this concept is limited then to students who are able to dedicate larger amounts of time during a day to studies and where the book can remain safe and protected within the confines of the classroom environment. Outside of the classroom, pieces get lost, Velcro™ gets clogged with lint and/or dust, and water may damage the book.

Another educational device that has been available on the market today is a transparent card having an inquiry printed on the face of the card. When the card is held up to a light, a word or picture will be provided responsive to or explanatory of the inquiry. This type of educational aid offers a relatively large selection of vocabulary words and more repetitive development of each word. Unfortunately, the cards are also not particularly portable, owing to the probability for loss or damage. The effort of picking up a dropped card deck just one time will curb many instructors from using this device.

Still another device is a workbook for teaching foreign languages, including various embodiments therein. This particular workbook uses facing pages that include, on one page, words and a picture in both languages and, on an opposite page, words in one language, pictures, and a space for writing in the other language. These workbooks are illustrative of the prior art text and workbooks, which may be found in a school or a structured instructional course.

Finally, another learning device available on the market today is a collection of disks or tablets that extends about a closed ring. Each disk or tablet may include an inquiry upon one side and a response or reply upon the other. The ring is a closed ring, which thereby permits the educational device to be used by children in a relatively unsupervised manner. The aforementioned examples are not meant to be exhaustive but are meant to briefly demonstrate the shortcomings of popular learning tools. What is needed instead is a teaching device that is designed for children alike that may be, unobtrusive, durable, self-paced, readily expanded, easily manufactured, portable, easy to use and compactly packaged.

The learning bracelet of the present invention represents a teaching device that overcomes the shortcomings of the learning devices available on the market today. In addition, the learning bracelet provides a fun, reusable, teaching device that is easy to use, inexpensive and allows an instructor to provide an avenue for students to get consistent, repetitive reinforcement on particular concepts and areas. The device of the present invention, allows the instructor to customize the information in the learning bracelet to each individual student. This customization is not usually available in published books, lists, and/or index cards. The learning bracelet briefly discussed above is further described in the sections immediately following.

SUMMARY OF THE INVENTION

The present invention is directed to a learning device that is an educational reminder for all students in all content areas. In particular, the present invention is directed to a learning bracelet for reinforcing new concepts. The learning bracelet of the present invention comprises a bracelet body having a compartment for receiving and displaying information scribed on a tangible medium. The compartment for receiving and displaying information comprises at least two portions configured to hold and display information scribed on the tangible medium. In one embodiment the compartment is configured to have at least two portions and at least one of the portions being at least partially translucent so as to display the information at a glance.

In an alternative embodiment the learning bracelet, the bracelet body comprises a LCD display for displaying information, the LCD having a communication means for communicating with a computer processing unit so that the tag and/or phrases to be learned can be programmed into the LCD display.

The body of the learning bracelet is attached and/or is contiguous with a strap assembly that includes a strap member. The strap member can be a single contiguous strap that is not adjustable, like a bangle bracelet, or can be in two distinct sections. The sections can be joined together once the bracelet is placed onto the user. The two distinct sections may be fastened using Velcro®, a buckling system (much like a strap on an adjustable watch band), a clasps system or the like. This system, unlike the bangle bracelet structure discussed above, allows the recipient to tighten the bracelet so that the learning tag within the body compartment is properly displayed.

Another embodiment of the invention is directed to a learning bracelet kit for reinforcing new concepts comprising the learning bracelet as described above and a sheet of material for printing vocabulary words and the like, divided into defined shapes by separatable lines. In the alternative, the kit can contain pre-printed, pre-sized tags that can be placed into the display compartment of the bracelet for viewing.

Another embodiment of the present invention is directed to a learning bracelet kit for reinforcing new concepts comprising a learning bracelet as described above, a learning tag book having a story where particular words in addition to being printed in the book also have corresponding learning tags attached to the book at the particular place where the words appear. The learning tag can be removeably attached to the book so that the learning tags can be given to students once the words has been read so that the students can inset them into their learning bracelet for study.

Still another embodiment of the invention is directed to a method for teaching new vocabulary words using the learning bracelet of claim and/or the learning bracelet kit described herein.

The present invention is further described in detail in the following sections in connection with FIGS. 1-5.

DETAILED DESCRIPTION OF THE INVENTION

The present invention is directed to a learning and/or memory bracelet that can be worn on the wrist of the user. The learning bracelet can be used as a learning tool for grade school students that need constant reinforcement in order to learn new concepts. The learning bracelet can be worn by a student while in class (or at home) and the word or phrase of the day can written on a learning tag and inserted into the display portion of the learning bracelet so that the word scribed on the inserted learning tag can be referred to by the user throughout the class (or at home).

Figure 1:
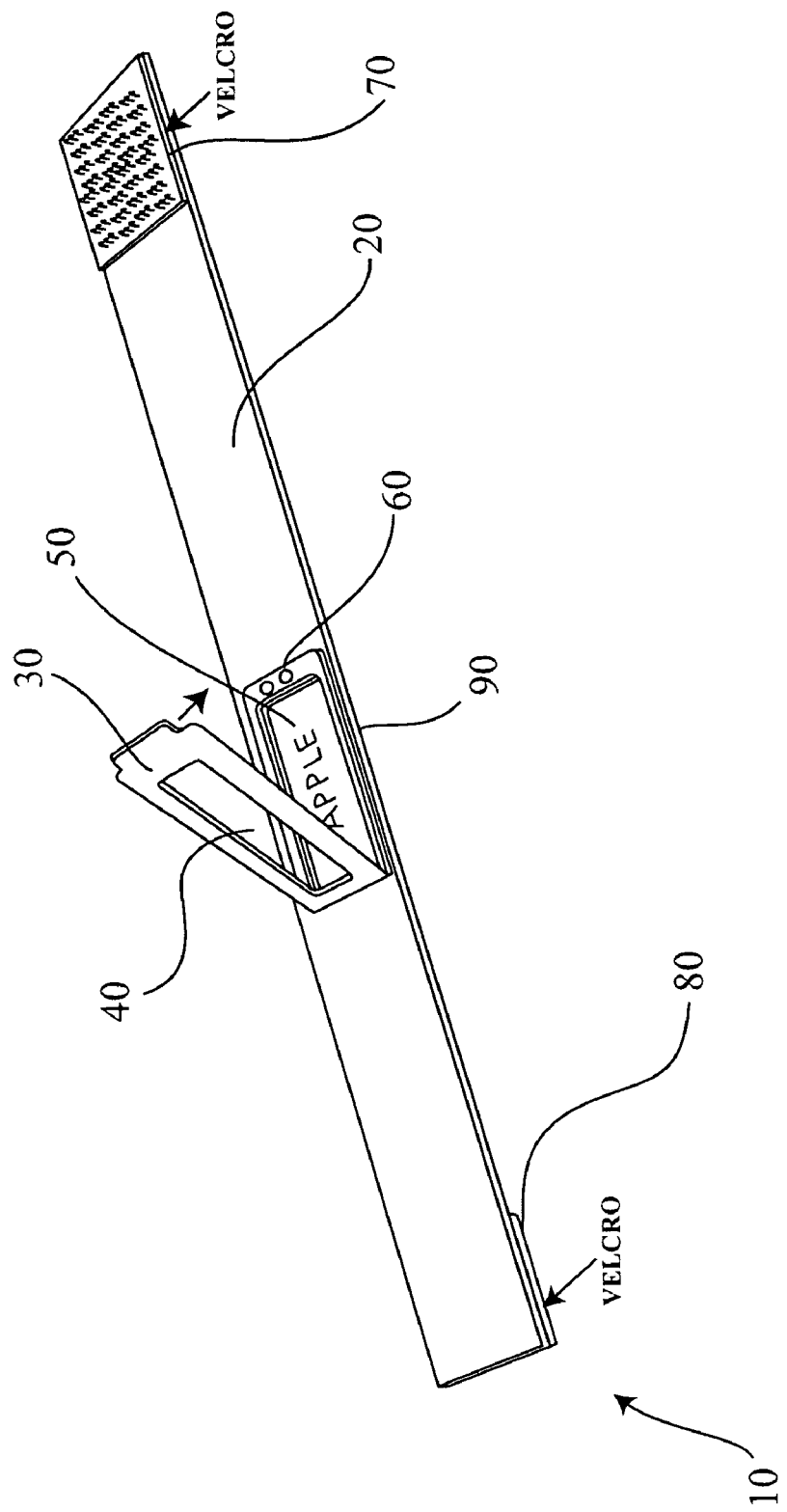
FIG. 1:
(10) Learning Bracelet
(20) Strap Assembly
(30) Compartment Cover
(40) Transparent Window
(50) Learning Tag
(60) Snap
(70) First Portion of Fastening Material
(80) Second Portion of Fastening Material
(90) Body of Compartment

FIG. 1 shows a perspective view of a learning bracelet (10) that has a strap assembly (20). The strap assemble (20) is connected to a compartment having a compartment cover (30) with an at least partially transparent window (40). The compartment cover (30) is attached to the body of the compartment (90) that has a snap mechanism (60) which allows the compartment cover (30) to snap close onto the bracelet body (90) in order to encase the learning tag (50) in place. Once shut, the learning tag (50) can be viewed through the at least partially transparent window (40) of the compartment, as it remains secured in place.

The compartment is attached to the strap assembly (20). The strap assembly (20) has a first portion of fastening material (70) on one end of the strap assembly (20) and a second portion of fastening material (80) on the other end. When the first portion of fastening material (70) is brought into contact with the second portion of fastening material (80) the strap assembly is in a closed configuration. Adjusting the first portion of fastening material (70) and the second fastening material (80) allows the user to tighten the strap assembly to the user's wrist.

When the word on the learning tag (50) needs to be changed, the compartment cover (30) is unsnapped and/or opened to reveal the learning tag. The learning tag is removed, and a new learning tag can be inserted. Once the new tag is in place, the compartment cover (30) can be closed to secure the learning tag in position and display the new word in the transparent window (40). This can be repeated over and over again so as to make the learning bracelet an economical reusable learning tool.

Figure 2:
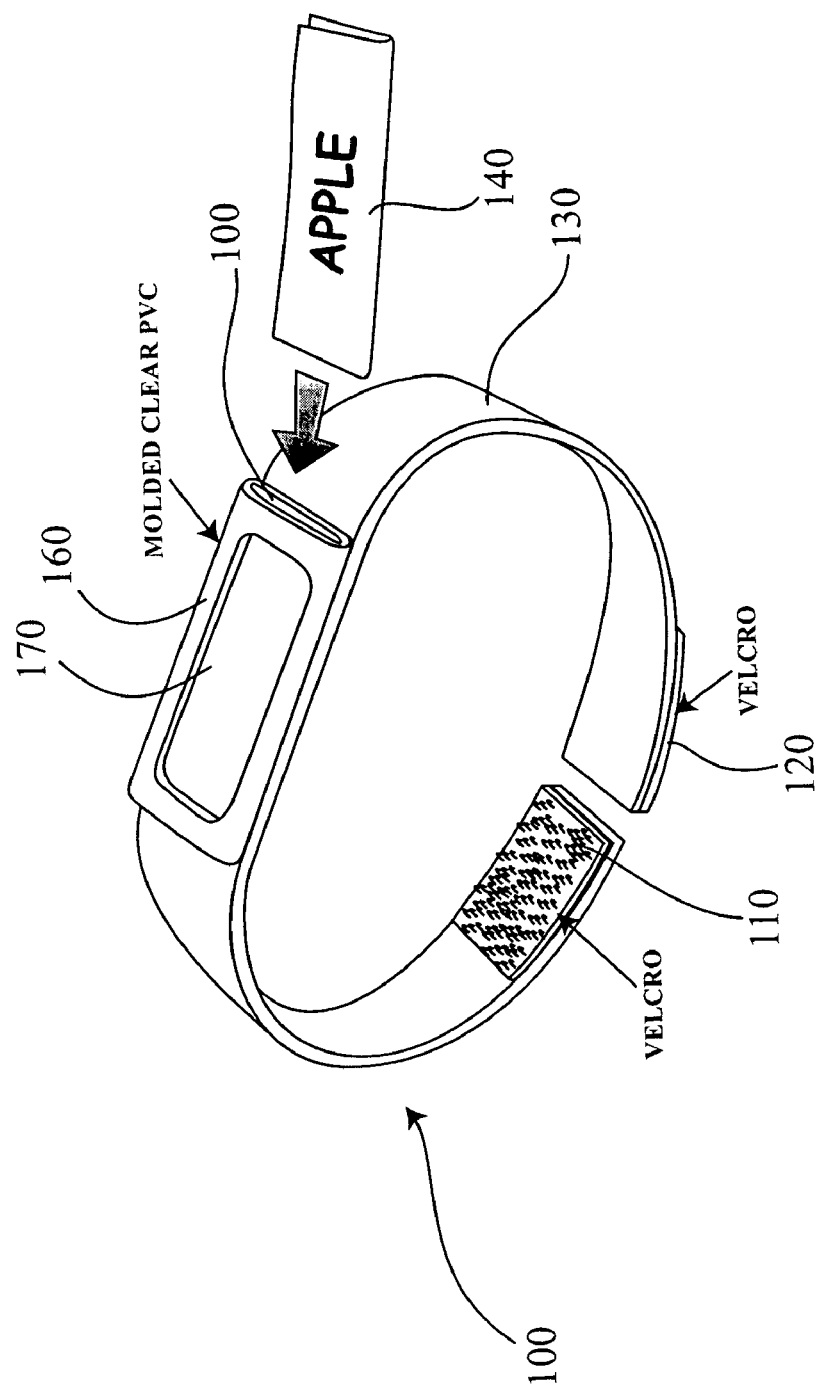
FIG. 2:
(100) Learning Bracelet
(110) First Portion of Fastening Material
(120) Second Portion of Fastening Material
(130) Strap Assembly
(140) Learning Tag
(150) Insert Opening
(160) Compartment
(170) Transparent Window

FIG. 2 shows a perspective view of an alternative embodiment of the learning bracelet. Like the learning bracelet in FIG. 1, the learning bracelet (100) shown in FIG. 2 has a strap assembly (130) with a first and second portions of fastening material (10) and (120) respectively. Like the previous embodiment, the strap assemble can be closed together by contacting the first and second fastening portions of the strap assembly.

In another embodiment of the invention, the fastening material can be selected from the group consisting essentially of Velcro™, lock-tight material, adhesive strips, clasps systems, button and button holes, snaps, magnetic claps and the like.

The compartment (160) of FIG. 2 differs from the compartment of FIG. 1 in that it is a continuous configuration that has a transparent window (170) and an insert opening (150). In order to position the learning tag (140) in place, the learning tag is inserted into the insertion opening and positioned in the transparent window (170). The learning tag can be made of a thicker paper like cardboard so that it fits tightly in the compartment and does not fall out. In the alternative, the learning tag (140) can be folded or made of plastic so as to have the same affect as stated above.

Figure 3:
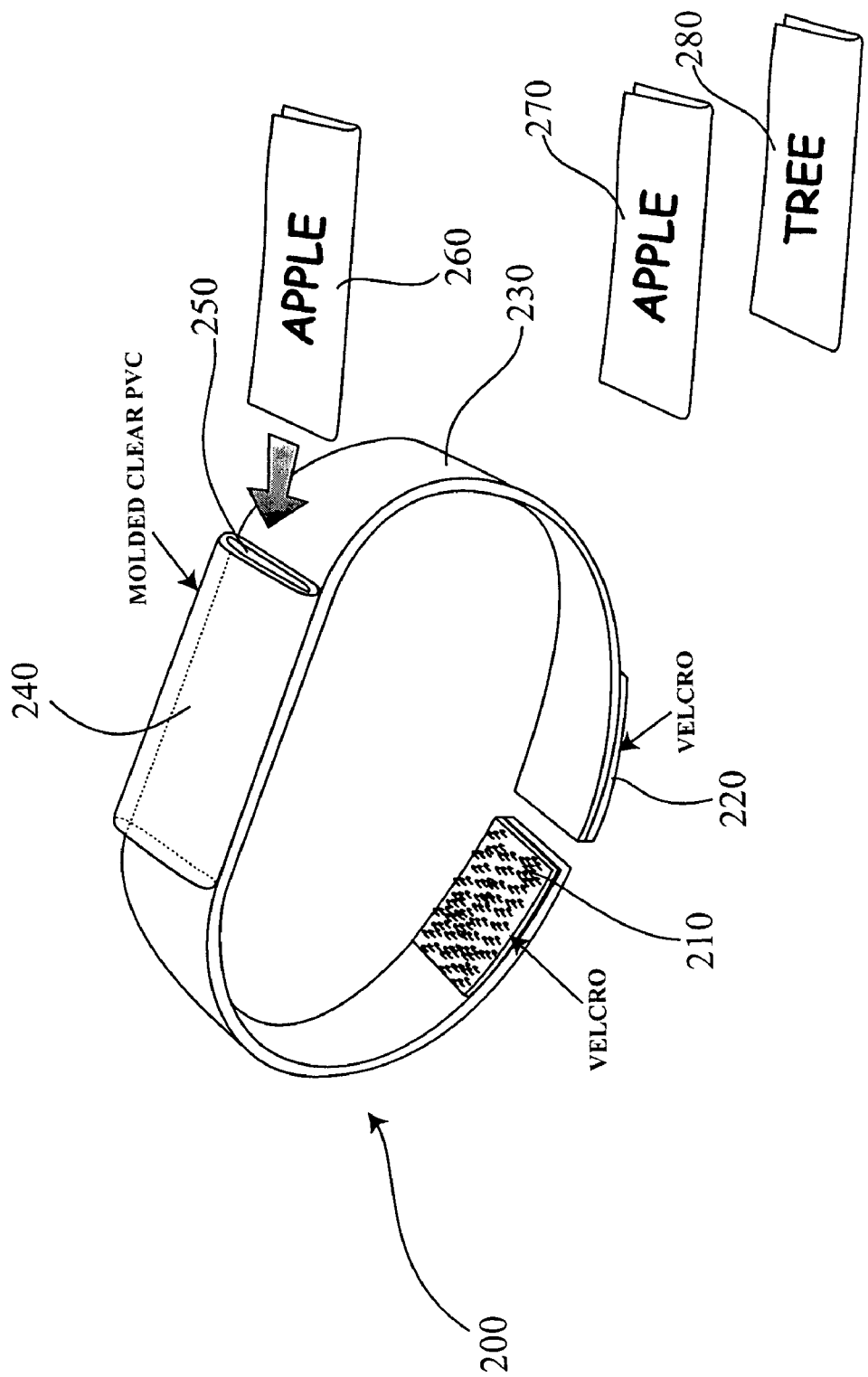
FIG. 3:
(200) Learning Bracelet
(210) First Portion of Fastening Material
(220) Second Portion of Fastening Material
(230) Strap Assembly
(240) Clear Material Compartment
(250) Insert Opening
(260) First Learning Tag
(270) Second Learning Tag
(280) Third Learning Tag

FIG. 3 shows the same perspective view as in FIG. 2, with several single strip two-ply learning tags that can be inserted into insert opening (250) into compartment (240). As indicated in this embodiment, compartment (240) can be entirely made of clear plastic making the window portion (shown in FIGS. 1 & 2) unnecessary.

Figure 4:
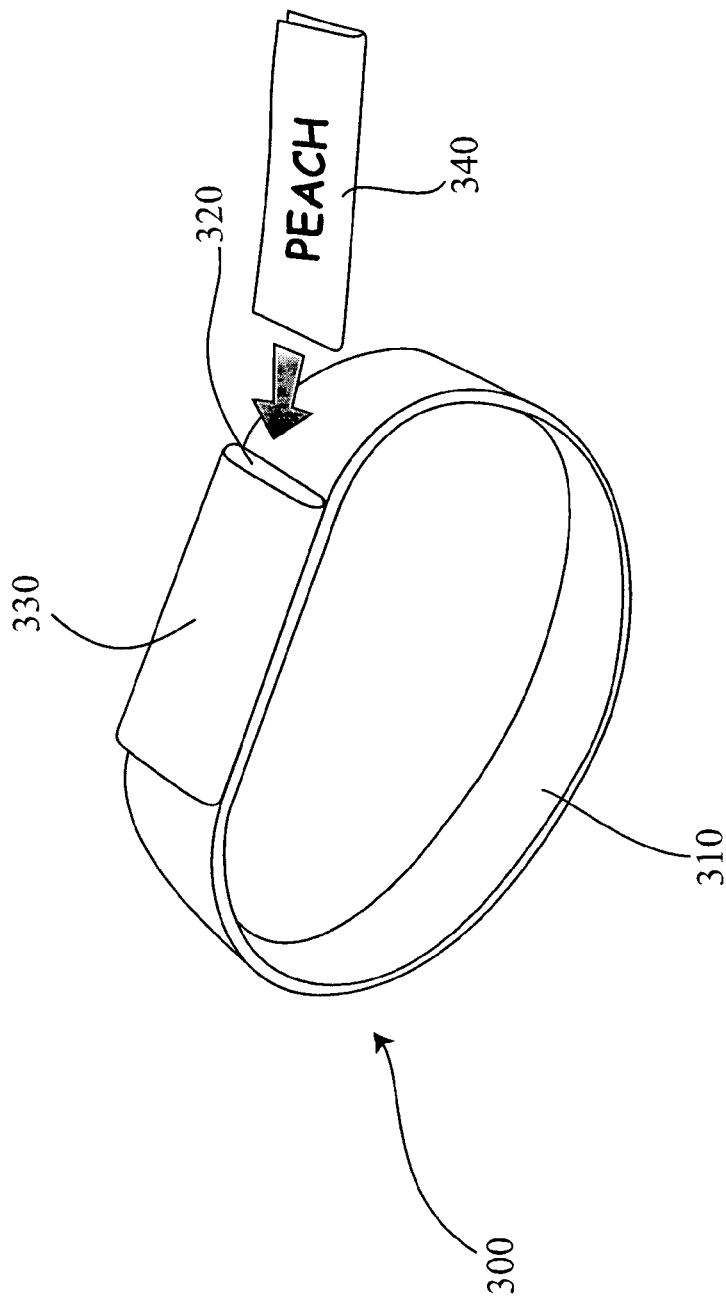
FIG. 4:
(300) Continuous Strap Learning Bracelet
(310) Bangle Bracelet Strap
(320) Insert Opening
(330) Clear Compartment
(340) Learning Tag
Figure 5:
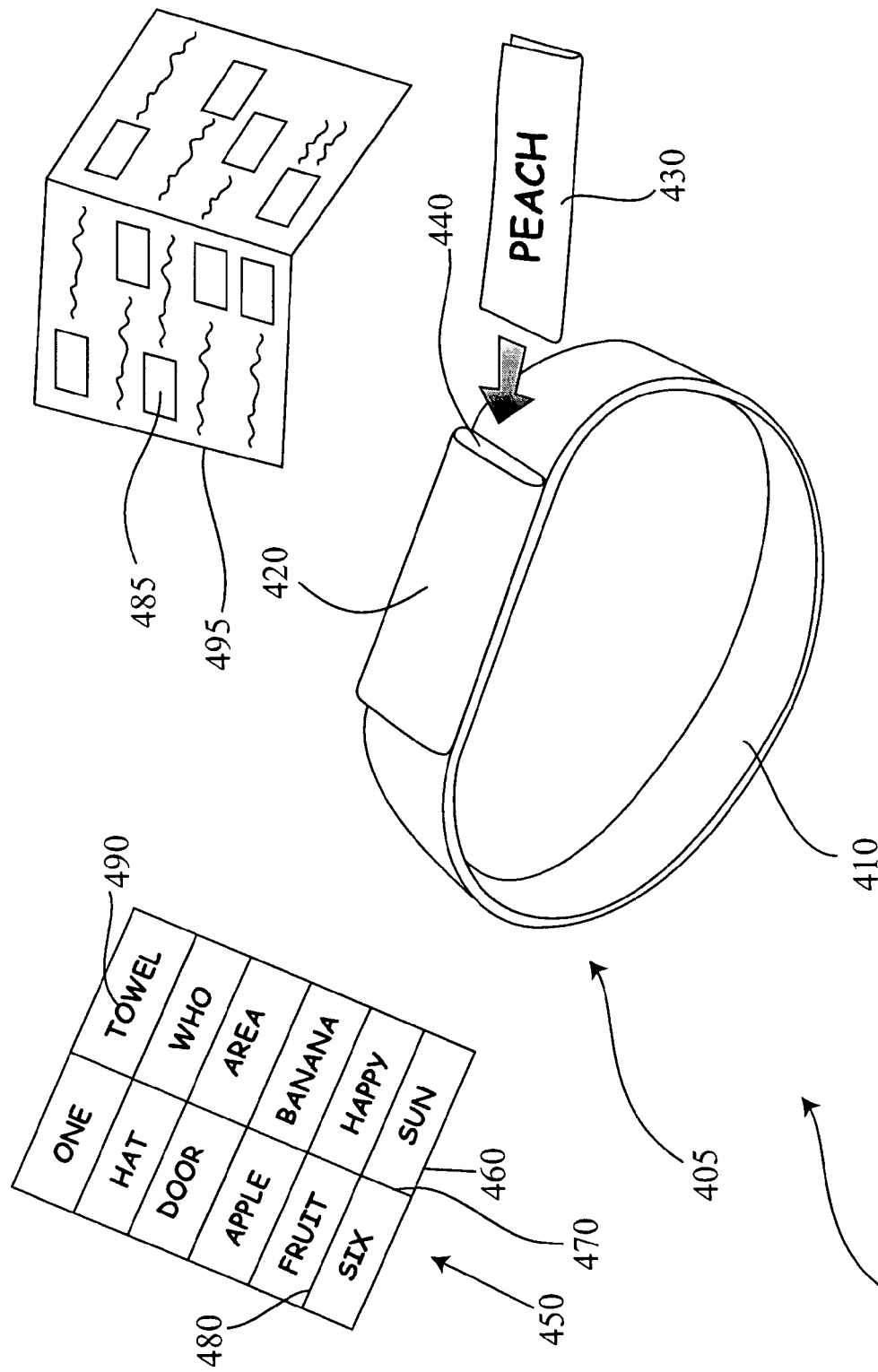
FIG. 5:
(400) Learning Bracelet Kit
(405) Learning Bracelet
(410) Continuous Strap Assembly
(420) Compartment with Transparent Portion
(430) Learning Tag
(440) Insert Opening
(450) Learning Tag Sheet
(460) Pre-printed Tag
(470) Vertical Separating Line
(480) Horizontal Separating Line
(485) Learning Tag Attachment
(490) Pre-printed Tag
(495) Learning Bracelet Book

FIG. 4 shows a learning bracelet (300) having a continuous strap assembly (310). The continuous strap assemble (310) allows the learning bracelet (300) to slip over the user's hand, like a bangle bracelet, so that it is positioned on the user's wrist. The learning bracelet (300) has a clear compartment (330) with and insert opening (320) for inserting the learning tag (340). The learning bracelet with the continuous strap can be made of a stretchable material so that it can expand to slide over the knuckles of the user for wearing and contract back to its normal size to fit tightly on the wrist once in position.

Another embodiment of the invention is directed to a learning bracelet kit (400). The learning bracelet kit (400) can contain one or more learning bracelets (405) of either the continuous strap assembly type or the adjustable strap assembly type. In addition to the bracelets, the kit has at least one learning tag sheet (450) having vertical and horizontal separable lines (480) and (470) respectively. The sheet can be configured so as to be printer friendly and/or can come with a series of terms already printed on the labels.

In another embodiment, the kit contains a learning book (495) that has removable learning tags (485) positioned throughout that can be removed and placed in the learning bracelet (410) as part of a learning lesson. Once the learning book (495) is read the first time and the removable learning tags (485) are distributed to various students in the class so that they can be inserted into their learning bracelet (410), the students are able to study their word throughout the day.

At the end of the day, or the beginning of the next school day, the book can be read for a second time and as the story is read and each learning tag that was removed is approached the teacher can call out the word and the person that has the learning tag in their bracelet can bring it to the teacher so that it can be reattached to the book. The book can either have a paste strip in the spaces in the book where the learning tags are positioned and/or a slit to insert the tag. Either way the learning bracelet kit allows for an interactive reading session everyday that the students will find enjoyable. The kit can contain several of these books that can be used over and over again with the learning bracelet.

Also part of the present invention is a method for teaching new vocabulary words and or concepts using the learning bracelet and/or the learning bracelet kit containing the learning book.

It is understood that the learning bracelet can be made out of one or more of the following materials leather, polyethylene, PVC, plastic, rubber, and silicone based material, and/or manmade materials. It is also anticipated that a computation of these materials can be used to make the learning bracelet. For example, the strap of the learning bracelet can be made out of leather where the compartment can be made out of PVC. Therefore it is within the scope of the invention that combinations of the materials can be used to make the learning bracelet.

In addition, the learning bracelet can be made from molding techniques that are well known in the art as well manual or machine driven assembly. All in all, depending on the material used to make the bracelet one skilled in the art would understand the different techniques that can be used to make the bracelet efficiently.

The learning bracelet can also be used as a memory bracelet. For example, an elderly person can place a time schedule for taking medicine, a specific task to be completed or some other information that the elderly person may need to be remember. The elderly person can wear the bracelet during the day and refer to the message periodically so as to jog the elderly person's memory. The structure of the bracelet to be used as a memory does not differ from the structure of the bracelet used for learning new concepts described above.

While the invention has been illustrated and described with respect to specific illustrative embodiments and modes of practice, it will be apparent to those skilled in the art that various modifications and improvements may be made without departing from the scope and spirit of the invention. Accordingly, the invention is not to be limited by the illustrative embodiments and modes of practice.

What is claimed is:
1. A method teaching new vocabulary words comprising:
(i) providing a learning bracelet having a display for displaying vocabulary words attached to a strap configured to secure said learning bracelet to a student's arm;
(ii) securing said learning bracelet to a student's arm so that said bracelet remains positioned on said student's arm for the duration in which said learning bracelet is worn and said display is visible by said student wearing said learning bracelet;
(iii) assigning a word to a student wearing said learning bracelet from a lesson plan and displaying said word on said display of said learning bracelet so that said vocabulary word is visible to said student wearing said learning bracelet;
(iv) using the vocabulary word as part of said lesson plan and reviewing said vocabulary word with the student as it is displayed on the students arm in full view;
(v) removing said vocabulary word from said display and replacing it with a different word form said lesson plan; and
(vi) repeating step (v) as necessary.
2. The method of claim 1 wherein a lesson plan is provided which has a plurality of new vocabulary words to be assigned to students in a class that are wearing said learning bracelet.

3. The method of claim 2 wherein said vocabulary words to be assigned are used in a story that is read out loud to the students to further reinforce the assigned vocabulary words.

4. The method of claim 3 wherein said lesson plan provides for the reading of the story from which the vocabulary words taken a second time and when said words are read a teacher can call out the word and the student that has said vocabulary word on their bracelet can pronounce the word and or spell the word and/or provide a definition for the word when called upon.

5. The method of claim 1 wherein the learning bracelet attached to the student's arm is shaped like a cartoon character or an animal.

6. A method teaching new vocabulary words comprising:
   (i) providing a learning bracelet having an inscribable erasable surface for displaying vocabulary words attached to a strap configured to secure said learning bracelet to a student's arm;
   (ii) securing said learning bracelet to a student's arm so that said bracelet remains positioned on said student's arm for the duration in which said learning bracelet is worn and a vocabulary word inscribed on said inscribable erasable surface remains visible by said student wearing said learning bracelet;
   (iii) assigning a word to a student wearing said learning bracelet from a lesson plan and inscribing said word on said inscribable erasable surface so that said vocabulary word is visible to said student wearing said learning bracelet;
   (iv) using the vocabulary word as part of said lesson plan and reviewing said vocabulary word with said student as it is displayed on said student's arm;
   (v) erasing said vocabulary word from said inscribable erasable surface and inscribing a new word taken form said lesson plan on said inscribable erasable surface; and
   (vi) repeating steps (iv) and (v) as necessary.

7. The method of claim 5 wherein a lesson plan is provided which has a plurality of new vocabulary words to be assigned to students in a class that are wearing said learning bracelet.

8. The method of claim 6 wherein said vocabulary words to be assigned are used in a story that is read out loud to the students to further reinforce the assigned vocabulary words.

9. The method of claim 8 wherein said lesson plan provides for the reading of the story from which the vocabulary words taken a second time and when said words are read a teacher can call out the word and the student that has said vocabulary word on their bracelet can pronounce the word and or spell the word and/or provide a definition for the word when called upon.

10. The method of claim 5 wherein the learning bracelet attached to the student is shaped like a cartoon character or an animal.

* * * * *